United States Patent
Al-Salem et al.

(10) Patent No.: US 11,033,869 B1
(45) Date of Patent: Jun. 15, 2021

(54) SYSTEM FOR PROCESSING WASTE

(71) Applicant: KUWAIT INSTITUTE FOR SCIENTIFIC RESEARCH, Safat (KW)

(72) Inventors: Sultan Al-Salem, Safat (KW); Animesh Dutta, Guelph (CA); Majed Hameed Al-Wadi, Safat (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 17/141,204

(22) Filed: Jan. 4, 2021

(51) Int. Cl.
*B01J 8/18* (2006.01)
*F23G 5/30* (2006.01)
*F23G 5/44* (2006.01)
*F23G 5/50* (2006.01)
*C10B 47/24* (2006.01)
*F23G 5/34* (2006.01)
*F23G 5/00* (2006.01)

(52) U.S. Cl.
CPC ............ *B01J 8/1836* (2013.01); *C10B 47/24* (2013.01); *F23G 5/30* (2013.01); *F23G 5/34* (2013.01); *F23G 5/446* (2013.01); *F23G 5/50* (2013.01); *F23G 5/006* (2013.01); *F23G 2203/40* (2013.01); *F23G 2203/50* (2013.01); *F23G 2900/50214* (2013.01); *F23G 2900/55* (2013.01)

(58) Field of Classification Search
CPC .......... B01J 8/1836; F23G 5/34; F23G 5/446; F23G 5/30; F23G 5/50; F23G 5/006; F23G 2900/50214; F23G 2900/55; F23G 2203/50; F23G 2203/40; C10B 47/24
See application file for complete search history.

(56) References Cited

U.S. PATENT DOCUMENTS

| 5,853,548 A | 12/1998 | Piskorz et al. |
| 8,100,990 B2 | 1/2012 | Ellens et al. |
| 10,550,330 B1 | 2/2020 | Yelvington et al. |

(Continued)

FOREIGN PATENT DOCUMENTS

CN 101875847 A 11/2010

OTHER PUBLICATIONS

"IEA Bioenergy Pyrolysis Reactors"; printed on Oct. 9, 2020 from https://task34.ieabioenergy.com/pyrolysis-reactors/.

(Continued)

*Primary Examiner* — David J Laux
(74) *Attorney, Agent, or Firm* — Nath, Goldberg & Meyer; Richard C. Litman (57) ABSTRACT

The system for processing waste includes both a fixed bed reactor and a fluidized bed reactor. The fixed bed reactor receives a first waste material and produces a first set of reaction products. The fluidized bed reactor is adapted for receiving a second waste material and producing a second set of reaction products. The first and second sets of reaction products may be selectively and adjustably mixed to produce a mixed set of reaction products. At least one cyclone separator receives the reaction products and separates and collects solids (waxes) from the product stream. At least one condenser receives the product stream and removes a condensable liquids from the product stream. The condensable liquids are collected, and a gas-liquid separator removes any remaining liquid from the gas stream. The remaining gas is then output as gaseous product.

20 Claims, 4 Drawing Sheets

(56) References Cited

U.S. PATENT DOCUMENTS

2008/0197012 A1 8/2008 Berruti et al.
2008/0271335 A1 11/2008 Kimball

OTHER PUBLICATIONS

Wang et al., "Catalytic fast co-pyrolysis of bamboo sawdust and waste tire using a tandem reactor wth cascade bubbling fluidized bed and fixed bed system". Energy Conversion and Management (2019), vol. 180, pp. 60-71 (Abstract only).

SYSTEM FOR PROCESSING WASTE

BACKGROUND

1. Field

The disclosure of the present patent application relates to the waste disposal, and particularly to a system for processing waste that includes both a fixed bed reactor and a fluidized bed reactor, which may each be operated separately and/or simultaneously. When operated simultaneously, the products of the two reactors may be combined or processed separately.

2. Description of the Related Art

Waste from industrial and municipal processes causes pollution on land, in the air, and in water. To reduce this problem, a significant part of such waste is disposed of in landfills and through incineration. However, these techniques are not able to manage waste sustainably. Landfills require a large land size and contribute to the emission of methane into the atmosphere. Incineration contributes to the release of $NO_x$ and dioxins.

Recycling of such waste is typically seen as the most desirable solution. However, there is no single generally accepted recycling process applicable to all forms of waste, and the efficiency and conversion rates of different recycling processes varies greatly, particularly due to the variation in composition and concentrations of the many different types of wastes. Recycling methods are broadly classified as either mechanical recycling or chemical recycling. Chemical recycling methods are of particular interest, since they can recover valuable products from waste without necessarily requiring additional separation or special treatment.

Chemical recycling techniques typically utilize thermochemical conversion, in which the energy content in the waste material is used advantageously to generate energy, ideally leaving behind value-added products from the conversion reaction. Organic wastes are particularly suited for such thermochemical conversion processes. The co-conversion of different waste materials exhibits various product distributions, including oil yield, gas yield, char yield, heating value, and hydrocarbon content. These various distributions result from the varying characteristics of the different waste feeds. For example, compared to biomass, plastics generally have higher carbon, hydrogen and volatile contents, but lower oxygen and moisture contents.

Most recycling reactors are optimized for just one type of reaction, i.e., they are specialized for the recycling of one particular material. Since the optimal concentrations and mixtures of reactants added to a reactor for one type of waste is unlikely to also be optimal for a different type of waste, it would be desirable to be able to establish a multi-reactor plant or system, allowing for the simultaneous conversion of different waste products, which may produce a mixture of reaction products having a synergistic effect to achieve a product distribution of interest. Thus, a system for waste processing solving the aforementioned problems is desired.

SUMMARY

The system for waste processing includes both a fixed bed reactor and a fluidized bed reactor, which may be operated either separately and/or simultaneously. When operated simultaneously, the products of the two reactors may be combined or processed separately. The fixed bed reactor is adapted for receiving a first waste material and producing a first set of reaction products. At least one external source of reaction gas is in fluid communication with the fixed bed reactor. For example, an external source of gaseous nitrogen, an external source of gaseous hydrogen/steam and an external source of gaseous oxygen/air may each feed into the fixed bed reactor.

The fluidized bed reactor is adapted for receiving a second waste material and producing a second set of reaction products. The external sources of reaction gases may also be selectively and controllably fed into the fluidized bed reactor. In addition to being used for particular reactions, the gaseous nitrogen may be used to restrict the flow of any escaped fumes. In addition to reacting solid waste, a liquid vessel, for receiving liquid waste, may be selectively and controllably placed in fluid communication with the fluidized bed reactor for the selective and adjustable mixing between the liquid waste and the second waste material, allowing the fluidized bed reactor to be used for reacting solid waste, liquid waste or a combination of the two.

The first and second sets of reaction products may be selectively and adjustably mixed to produce a mixed set of reaction products. At least one cyclone separator receives the mixed set of reaction products and separates and collects solids therefrom to produce a mixed set of fluids. For example, a pair of cyclones, connected to one another in series, may be used to separate out the solids. Each cyclone separator may feed the separated solids into a respective collection vessel, and each collection vessel may rest on a corresponding scale, balance or the like for the immediate weighing of the collected solids.

At least one heat exchanger/condenser receives the mixed set of fluids and produces a liquid stream and a gas stream. For example, a plurality of condensers, connected to one another in series, may be used to condense any condensable gases and extract the liquid. Each condenser may feed the liquids into a respective collection vessel, and each collection vessel may rest on a corresponding scale, balance or the like for the immediate weighing of the collected liquids. A gas-liquid separator removes any remaining liquid from the gas stream, which contains any non-condensable gases remaining from the condensers. The remaining gas is then collected.

A scrubber may be also be provided, in fluid communication with the gas-liquid separator, for removing unwanted gas components from the gas. This treated gas may then be collected in a pressure vessel, which is in fluid communication with the scrubber. The gas may then be further treated in an alkali vessel in fluid communication with the pressure vessel for removing gaseous sulfides from the gas.

These and other features of the present subject matter will become readily apparent upon further review of the following specification and drawings.

DETAILED DESCRIPTION OF THE PREFERRED EMBODIMENTS

Figure 1:
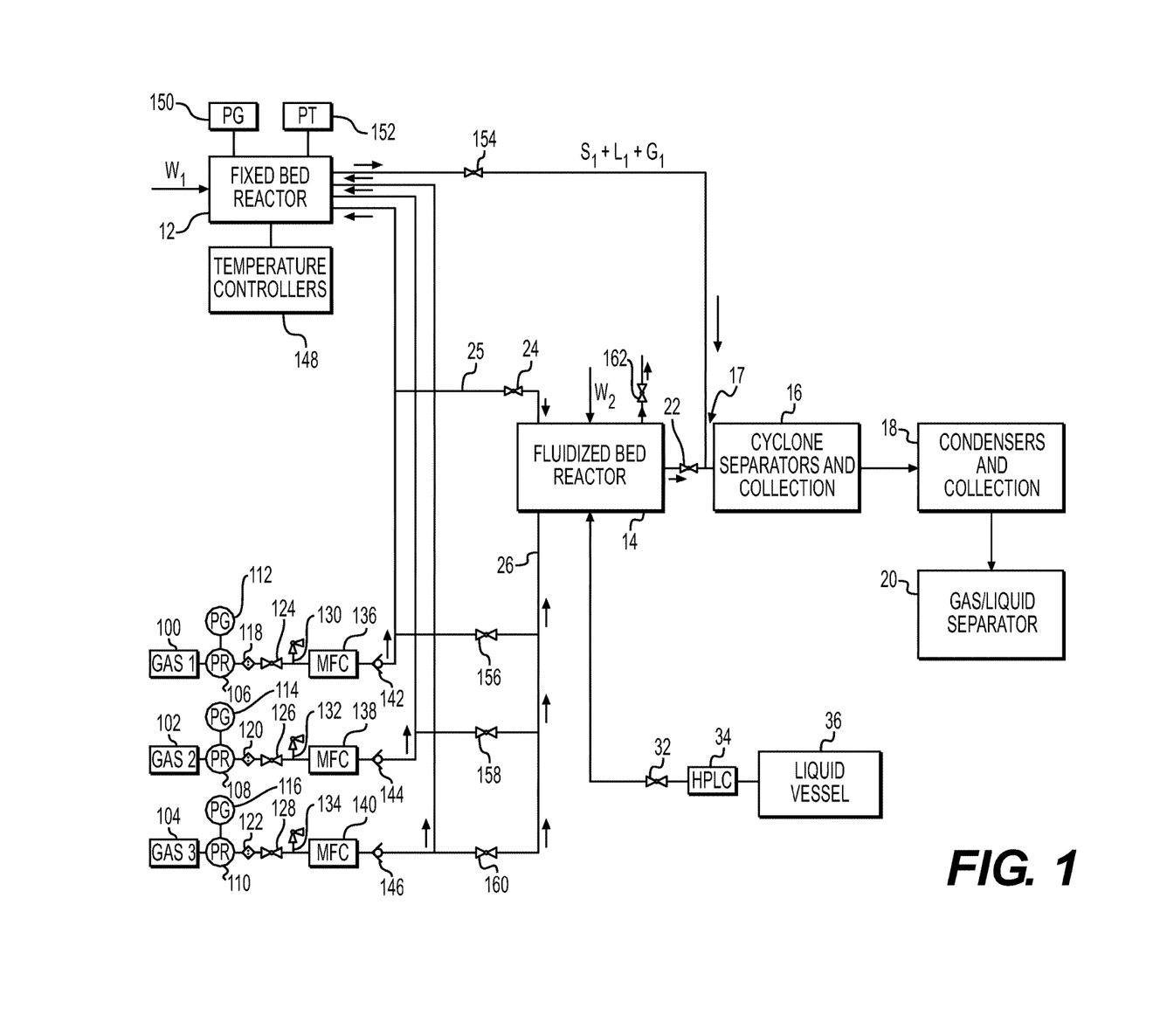
FIG. 1 is a block diagram of a system for waste processing.

Referring now to FIG. 1, the system for waste processing, designated generally as 10 in the drawings, includes both a fixed bed reactor 12 and a fluidized bed reactor 14, which may be operated either separately or simultaneously. The system 10 is designed to accept different types of waste material, such as biomass, plastics, waste tires, municipal solid waste (MSW), and liquid feed, and recycle the waste to energy and/or useful products, including oils, waxes, and gases, by thermochemical conversion. The reactors 12, 14 may be configured to perform different types of reactions, depending upon the gas provided, e.g., pyrolysis (in nitrogen atmosphere), combustion (in oxygen or air atmosphere), or hydrogenation (in the presence of hydrogen or steam), or other gasification reaction, and upon temperature (the system 10 has a heat source that may include split furnaces providing up to 1000° C. for pyrolysis, up to 600° C. for combustion, etc., and each reactor may be split into three temperature zones for independent monitoring and temperature control, depending on the feed and the desired reaction products).

The fixed bed reactor 12 is provided to process waste material that is difficult to fluidize in the fluidized bed reactor. The fixed bed reactor 12 is a horizontal reactor, which results in increased particle residence time. The fixed bed reactor 12 is adapted for receiving a first waste material $W_1$ and producing a first set of reaction products, which may be multiphase products; i.e., solids $S_1$, liquids $L_1$ and gases $G_1$. It should be understood that fixed bed reactor 12 may be any suitable type of horizontal fixed bed reactor. As in a conventional fixed bed reactor, fixed bed reactor 12 is a heterogeneous catalytic reactor, and may include, for example, a cylindrical tube filled with catalyst pellets. The bed may be sand or silica sand and the catalyst may be olivine or a nickel-based catalyst, for example. Reactants (i.e., first waste material $W_1$ and reactant gases, as will be described below) flow through the bed and are converted into the first set of reaction products (i.e., solids $S_1$ (such as waxes), liquids $L_1$ (such as oils) and gases $G_1$ (such as hydrocarbons)). It should be understood that the catalyst may have multiple configurations, including, but not limited to, one large bed, several horizontal beds, several parallel packed tubes, multiple beds in their own shells and the like. The various configurations may be adapted depending on the need to maintain temperature control within the system. In typical fixed bed reactor reactions, such as pyrolysis reactions, the solids produced may be in the form of waxes, and the liquids produced may be in the form of oils.

As shown in FIG. 1, in order to control reaction conditions within fixed bed reactor 12, one or more temperature controllers 148 may be provided, along with a pressure gauge (PG) 150 and a pressure transmitter (PT) 152, for transmitting measured pressured data to an external controller. A typical operating temperature for fixed bed reactor 12 is in the range of 600° C., although the temperature can be adjusted and controlled via temperature controllers 148. The reactant gases are provided by at least one external source of reaction gas in fluid communication with the fixed bed reactor 12. In FIG. 1, three such sources of gas 100, 102 and 104 (labeled "Gas 1", "Gas 2" and "Gas 3", respectively) are provided, although it should be understood that any desired number of external sources of reactant gas may be connected to fixed bed reactor 12. For example, the gas provided by source 100 may be gaseous nitrogen, the gas provided by source 102 may be gaseous hydrogen/steam, and the gas provided by source 104 may be gaseous oxygen/air.

In order to control the flow of nitrogen, for example, into fixed bed reactor 12, a pressure regulator 106, in communication with an associated pressure gauge 112, is provided. A line filter 118 may be provided for filtering the gas, and primary control over the flow is provided by valve 124, which may be a conventional isolation valve, for example. A pressure safety valve 130 may further be included, feeding into a mass flow controller (MFC) 136 for providing automated and/or manually operated control over the gas flow, with final control being provided by a check valve 142. Similarly, in order to control the flow of hydrogen, for example, into fixed bed reactor 12, a pressure regulator 108, in communication with an associated pressure gauge 114, is provided. A line filter 120 may be provided for filtering the gas, and primary control over the flow is controlled by valve 126, which may be a conventional isolation valve, for example. A pressure safety valve 132 may further be included, feeding into MFC 138 for providing automated and/or manually operated control over the gas flow, with final control being provided by check valve 144. Similarly, in order to control the flow of oxygen, for example, into fixed bed reactor 12, a pressure regulator 110, in communication with an associated pressure gauge 116, is provided. A line filter 122 may be provided for filtering the gas, and primary control over the flow is controlled by valve 128, which may be a conventional isolation valve, for example. A pressure safety valve 134 may further be included, feeding into MFC 140 for providing automated and/or manually operated control over the gas flow, with final control being provided by check valve 146.

Under the control of MFCs 136, 138, 140, the type of reaction taking place in fixed bed reactor 12 can be controlled. For example, if only nitrogen is allowed to be input into the fixed bed reactor 12, then a pyrolysis reaction takes place within fixed bed reactor 12. If oxygen and nitrogen, air and nitrogen, or carbon dioxide and steam are input into fixed bed reactor 12, then a gasification reaction takes place within fixed bed reactor 12. If only hydrogen is allowed to be input into the fixed bed reactor 12, then a hydrogenation reaction takes place within the fixed bed reactor 12. If pure oxygen or air is supplied above the stoichiometric value, then combustion will occur. The flow rates of the feed gases may be monitored by an external supervisory control and data acquisition system (SCADA).

Figure 2:
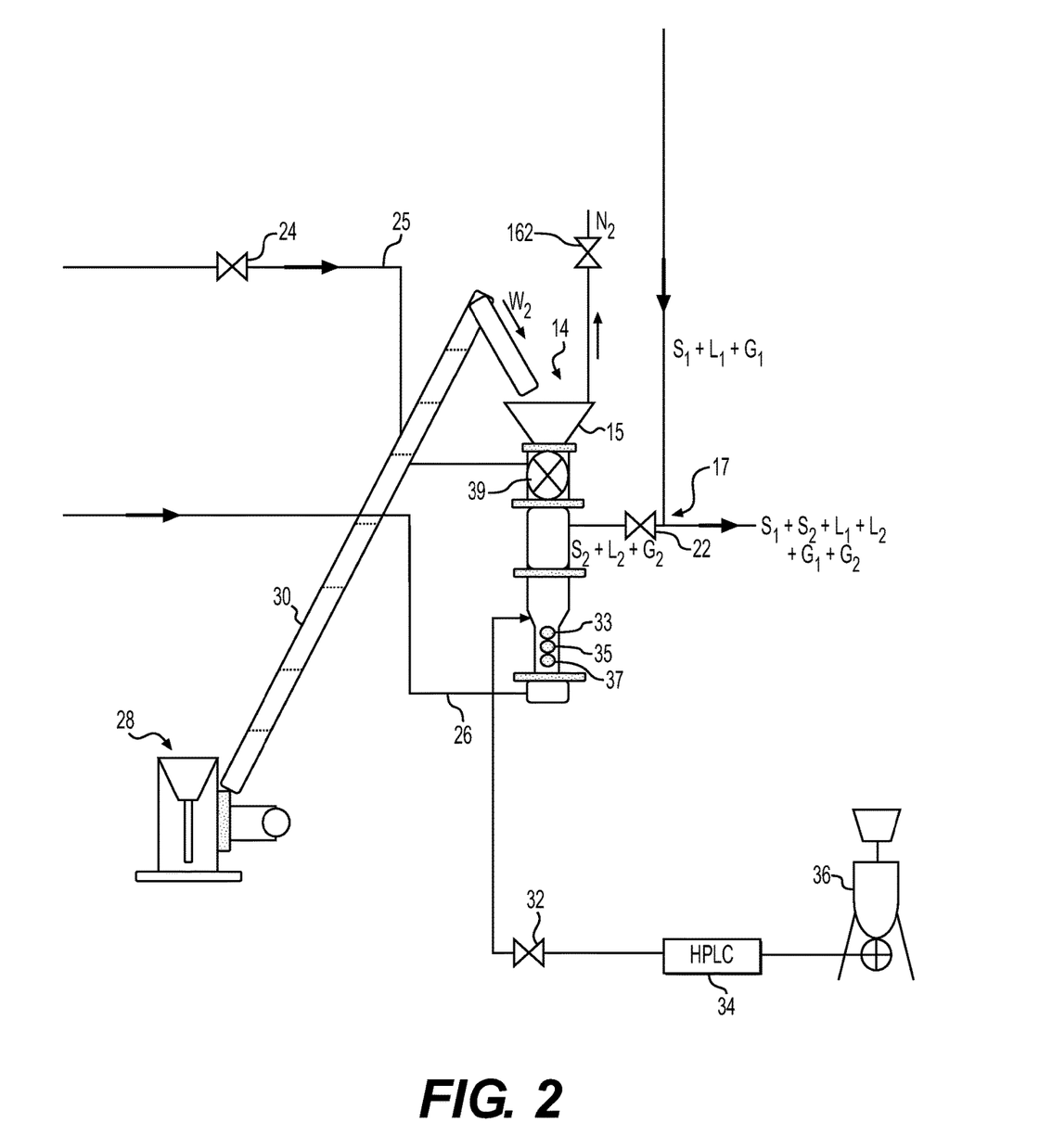
FIG. 2 is a schematic diagram of a fluidized bed reactor in the system for waste processing of FIG. 1.

The fluidized bed reactor 14 is adapted for receiving a second waste material $W_2$ and producing a second set of reaction products (i.e., solids $S_2$, liquids $L_2$ and gases $G_2$). As best shown in FIG. 2, the second waste material $W_2$ may be fed into a hopper 15 of fluidized bed reactor 14 by a conveyer belt 30 (with its own hopper 28) or the like. It should be understood that hopper 28 and conveyer belt 30 are shown in FIG. 2 for exemplary purposes only. For example, conveyer belt 30 may be part of an automated system carrying waste at a rate on the order of 5 kg/hour. To further control the waste feeding process, a rotary valve 39 is provided between hopper 15 and the reactor body. The fixed bed reactor 12 has a separate feed (not shown), which may be a boat.

It should be further understood that the fluidized bed reactor 14 may be any suitable type of fluidized bed reactor. As in a conventional fluidized bed reactor, a variety of multiphase chemical reactions may take place, through input of reaction gases (through line 26), which then pass through a solid granular material (i.e., a granular catalyst) at high enough speeds to suspend the solid and cause it to behave as though it were a fluid. For example, sand may be used as the fluidization media and olivine ($(Mg, Fe)_2SiO_4$) may be used as a catalyst. The solids retain heat and provide the required energy for endothermic reactions taking place within the reactor. The fluidized bed reactor 14 (FBR) is constructed in such a way that elutriation of bed and char is avoided. This is achieved by having a larger area in the freeboard region compared to the bed region. Although the freeboard region is insulated, the region is not externally heated. Thus, the larger area and lower temperature of the freeboard region aid in the prevention of elutriation of bed material and char. Likewise, the bed material and char are retained in the fixed bed reactor 12. The solid products are limited to wax.

As shown in FIG. 1, the reaction gases, which flow through line 26 into the fluidized bed reactor 14, are provided by the external sources of reactant gas 100, 102, 104. Valves 156, 158, 160, respectively, allow the flow rate and concentrations of each gas to be controlled as they pass into the fluidized bed reactor 14. As shown, an additional line 25 may be provided to allow the gaseous nitrogen to be used to restrict the flow of any escaped fumes in fluidized bed reactor 14. Control over the flow of this nitrogen stream may be controlled by a valve 24, which may be a conventional isolation valve or the like. A controllable nitrogen purge (controlled by isolation valve 162) may also be provided.

In addition to reacting solid waste $W_2$, a liquid vessel 36, for receiving liquid waste, may be selectively and controllably placed in fluid communication with the fluidized bed reactor 14 for the selective and adjustable mixing between the liquid waste and the second waste material $W_2$, allowing the fluidized bed reactor 14 to be used for reacting solid waste, liquid waste or a combination of the two. Any suitable type of pump may be used to transfer the liquid waste from the liquid vessel 36 to the fluidized bed reactor 14. For example, a high-performance liquid chromatography (HPLC) pump may be used to introduce metered volumes of liquid into the FBR 14, with control over the liquid flow being controlled by valve 32.

The first and second sets of reaction products may be processed separately, or they may be selectively and adjustably mixed to produce a mixed set of reaction products. As shown in FIGS. 1 and 2, the output of the fixed bed reactor 12 (i.e., solids $S_1$, liquids $L_1$ and gases $G_1$) may be controlled by valve 154, which may be a conventional needle valve or the like, and may be mixed with the output of fluidized bed reactor 14 (i.e., solids $S_2$, liquids $L_2$ and gases $G_2$) at junction 17. The output of the fluidized bed reactor 14 (i.e., solids $S_2$, liquids $L_2$ and gases $G_2$) is controlled by valve 22, which may be a conventional isolation valve or the like. The fluidized bed reactor 14 may be operated up to 1000° C. in either a batch or a continuous mode. The fluidized bed reactor 14 may be externally heated by a split type furnace, with temperature being monitored at three different locations with K-type thermocouples 33, 35, 37, for example.

Figure 3:
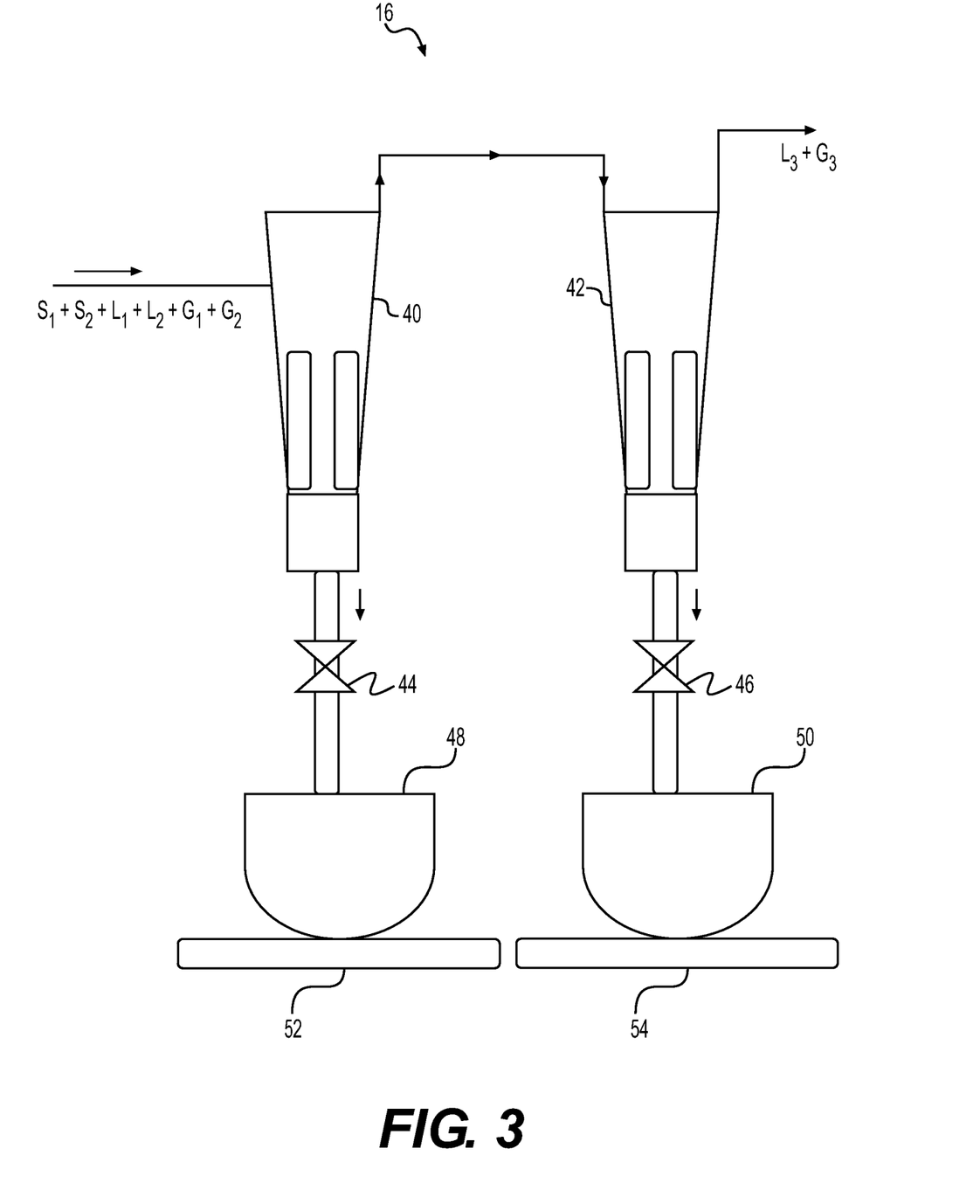
FIG. 3 is a schematic diagram of a pair of cyclone separators in the system for waste processing of FIG. 1.

At least one cyclone separator 16 receives the mixed set of reaction products and separates and collects solids therefrom to produce a mixed set of fluids. For example, a pair of cyclone separators, connected to one another in series, may be used to separate out the solids. In FIG. 3, two cyclone separators 40, 42 are connected to one another in series, the first cyclone separator 40 receiving the mixed set of reaction products, and the second cyclone separator 42, following separation of the solids, produces a mixed set of fluids, in the form of one or more liquids $L_3$ mixed with one or more gases $G_3$. The first cyclone separator 40 separates out a portion of the solids (waxes) and feeds the solids (under the control of valve 44, which may be an isolation valve or the like) into a collection vessel 48, which may rest on a corresponding scale 52, balance or the like for the immediate weighing of the collected solids. Scale 52 may have an integrated heating element, or may attached to a separate heater, providing the capability of performing any suitable type of thermal reactions or analysis. Similarly, second cyclone separator 42 separates out the remaining solids and feeds the solids (under the control of valve 46, which may be an isolation valve or the like) into a collection vessel 50, which may rest on a corresponding scale 54, balance or the like for the immediate weighing of the collected solids. The scale 54 may also have an integrated heating element, or may attached to a separate heater, providing the capability of performing any suitable type of thermal reactions or analysis.

It should be understood that cyclone separators 40, 42 may be any suitable type of cyclone separators, including cyclone separators with integrated heating elements. For example, each cyclone separator 40, 42 may be heated to operate at a temperature of approximately 400° C. (i.e., below the temperature of the reactors), which minimizes or eliminates the accumulation of condensate or products on the cyclone surface. Such a heated system also allows for further conversion of mixed products from the two reactors. Typically, the solids collected will be in the form of waxes.

At least one condenser 18 receives the mixed set of fluids and produces a liquid stream $L_4$ and a gas stream $G_4$. For example, a plurality of condensers, connected to one another in series, may be used to condense any condensable gases and extract the liquid. In the particular example of FIG. 4, first, second and third condensers 60, 62, 64 are connected to one another in series. The condensers 60, 62, and 64 may be heat exchangers configured to operate as condensers. The first condenser 60 condenses any condensable gases and outputs liquid (including condensed gas) and non-condensable gas, which is then collected in a collection vessel 66. Collection vessel 66 may rest on a corresponding scale 72, balance or the like for the immediate weighing of the collected fluids. Scale 72 may also have an integrated heating element, or may attached to a separate heater, providing the capability of performing any suitable type of thermal reactions or analysis. The contents of collection vessel 66 are then cycled into second condenser 62, which condenses any remaining condensable gases and outputs liquid (including condensed gases) and non-condensable gases, which are then collected in collection vessel 68. Collection vessel 68 may rest on a corresponding scale 74, balance or the like for the immediate weighing of the collected fluids. The scale 74 may also have an integrated heating element, or may be attached to a separate heater, providing the capability of performing any suitable type of thermal reactions or analysis. In this example, the contents of collection vessel 68 are then cycled into the third condenser 64, which condenses any remaining condensable gases and outputs liquid (including condensed gases) and non-condensable gases, which are then collected in collection vessel 70. Collection vessel 70 may rest on a corresponding scale 76, balance or the like for the immediate weighing of the collected fluids. The scale 76 may also have an integrated heating element, or may attached to a separate heater, providing the capability of performing any suitable type of thermal reactions or analysis. As shown, each of condensers 60, 62, 64, as well as collection vessels 66, 68, 70, are in a thermal cycle with chiller 200, which may be any suitable type of chiller or source of refrigeration, which provides the temperature differential for condensing the condensable gases. For example, the condensers 60, 62, 64 may be double pipe heat exchangers. Heat from the double pipe heat exchangers 60, 62, 64 is recovered and used as the heat source for the chiller 200, and the chilled fluid is recirculated to the heat exchangers 60, 62, 64 through the collection vessels 66, 68, 70.

Figure 4:
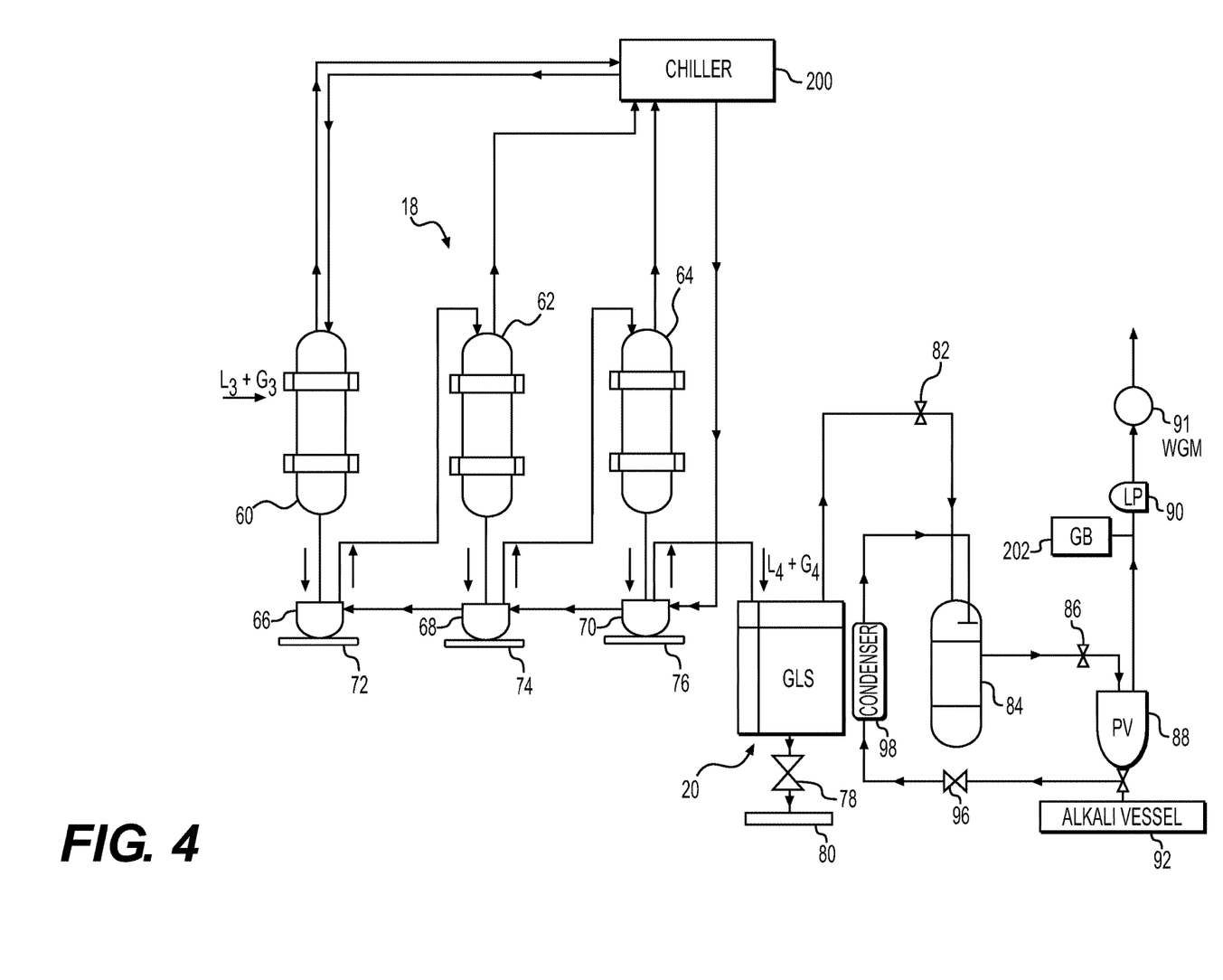
FIG. 4 diagrammatically illustrates condensers and a gas-liquid separator of the cascade waste conversion reactor and separator.

A gas-liquid separator 20 removes any remaining liquid $L_4$ from the gas stream $G_4$, which contains any non-condensable gases remaining from the condensers 60, 62, 64. It should be understood that the gas-liquid separator 20 may be any suitable type of gas-liquid separator. The separated liquid is collected in a collection vessel 80, and liquid flow is controlled by a valve 78. The remaining gas is then collected.

A scrubber 84 may be also be provided, in fluid communication with the gas-liquid separator 20, for removing unwanted and/or harmful gas components from the gas. For example, in the gasification of polyvinyl chloride (PVC), HCl is produced, which may then be scrubbed out by scrubber 84. The treated gas may then be collected in a pressure vessel (PV) 88, which is in fluid communication with the scrubber 84. The gas may then be further treated in an alkali vessel 92 in fluid communication with the pressure vessel 88 for removing gaseous sulfides from the gas. As shown, the flow of the gas into the scrubber 84 may be controlled by a valve 82, and flow of the scrubbed gas to the pressure vessel 88 may be controlled by valve 86, which may be a conventional needle valve or the like. Flow of the gas into the alkali vessel 92 may also be controlled by valve 94, and cycling of the gas back into the scrubber 84 (through a condenser 98) may be controlled by valve 96, which may be a conventional isolation valve or the like. It should be understood that any suitable type of pump or the like may be used to cycle the gas through the condenser 98 and back into the scrubber 98. Additionally, gas may be vented from the pressure vessel 88 into a gas bomb (GB) 202, which serves as a gas collection point, and into (and/or through) catch pot 90. The catch pot 90 is provided for assisting with the removal of moisture and other particles from the outlet gas, as well as reducing the discharge pressure of the gas before moving to the wet gas meter (WGM) 91. The catch pot 90 can also act as a pressure dampener to decrease pressure. The gas bomb 202 acts as a gas collection point for either online or offline gas component analysis. For example, the alkali vessel 92 may contain NaOH solution. This may be used to remove any of the gaseous sulfides present in the gas product, such as $H_2S$.

In order to test the system 10, pyrolysis experiments were performed in an atmosphere of nitrogen with a gas flow rate of 10 L/min. The waste feedstock materials used in the tests were linear low-density polyethylene (LLDPE), high-density polyethylene (HDPE), and waste paper. Experiments for all samples were carried out in the fluidized bed reactor 14 using sand and olivine as the bed materials. The pyrolysis experiments were performed by operating the electric furnace at 650° C., and the cyclone temperatures in cyclone separators 40, 42 were maintained at 300° C. For the HDPE and LLDPE samples, the fluidized bed reactor 14 was operated in a continuous mode with a feed rate of 5 kg/h. The fluidized bed reactor 14 was, however, operated in a batch mode for the conversion of the waste paper samples.

Example 1

Pyrolysis of LLDPE in Sand Bed

In the first experimental test, linear low-density polyethylene (LLDPE) was pyrolyzed in the fluidized bed reactor 14 with sand as the bed material. A total of 5.2 kg LLDPE was used in this experimental run. The total weight of the bed material (sand) was 1.908 kg. The bulk density of the sand particles was 1.59 $g/cm^3$, and the experiment was performed for 98 min. Table 1 below presents the results of the solid, liquid and gas quantities obtained in the final product.

TABLE 1

Results for LLDPE with 100% sand

| Product | Quantity In | Quantity Collected |
| --- | --- | --- |
| Total gas (including nitrogen) | | 3276 L |
| | Solid: wax | |
| Cyclone 1: | 0.04 kg | 0.012 kg |
| Cyclone 2: | 0.028 kg | 0.028 kg |
| Condenser 1: | 0 kg | 0 kg |
| Condenser 2: | 0 kg | 0 kg |
| Condenser 3: | 0 kg | 0 kg |
| GLS: | 0 kg | 0 kg |
| Total solid | | 0.04 kg |
| | Liquid: oil | |
| Cyclone 1: | 0.655 kg | 0 kg |
| Cyclone 2: | 0.655 kg | 0 kg |
| Condenser 1: | 0.655 kg | 0.44 kg |
| Condenser 2: | 0.215 kg | 0 kg |
| Condenser 3: | 0.215 kg | 0.215 kg |
| GLS: | 0 kg | 0 kg |
| Total liquid | | 0.655 kg |
| Total Char | | 0.011 kg |

Overall, the products obtained from the pyrolysis experiments of LLDPE were wax (0.04 kg), liquid in the form of bio-oil (0.655 kg) and biochar (0.011 kg), which were, respectively, 0.8%, 12.6% and 0.2% of the feed. By mass balance, the weight of the gas in the product was 4.494 kg (86.4% of the feed). By excluding the amount of nitrogen in the product gas, the volume of the obtained gas would be 2296 L. The gas product has the highest content in the product distribution, which may be attributed to the degradation characteristics of LLDPE. The sample degrades at low temperatures, and thus cracking of its polymeric structure at the high pyrolysis temperature enhances the formation of more gas product.

Example 2

Pyrolysis of LLDPE in Sand/Olivine Bed

In order to study the effects of bed material, the second experiment was performed by using a mixture of sand (90 vol %) and olivine (10 vol %) as the bed materials. The bulk density of the olivine was 1.4 $g/cm^3$. In this run, 5 kg of LLDPE was used. Here, the weight of sand and olivine was 1717.2 g and 168 g, respectively, and the experiment was performed for 142 min. Results of the solid, liquid and the gaseous components of the product can be found in Table 2 below.

TABLE 2

Results for LLDPE with 90 vol% sand + 10 vol% olivine

| Product | Quantity In | Quantity Collected |
| --- | --- | --- |
| Total gas (including nitrogen) | | 2584 L |
| | Solid: wax | |
| Cyclone 1: | 4.301 kg | 1.448 kg |
| Cyclone 2: | 2.853 kg | 0.885 kg |
| Condenser 1: | 1.968 kg | 1.282 kg |

TABLE 2-continued

Results for LLDPE with 90 vol% sand + 10 vol% olivine

| Product | Quantity In | Quantity Collected |
|---|---|---|
| Condenser 2: | 0.686 kg | 0.686 kg |
| Condenser 3: | 0 kg | 0 kg |
| GLS: | 0 kg | 0 kg |
| Total solid | | 4.301 kg |
| Liquid: oil | | |
| Cyclone 1: | 0.0066 kg | 0 kg |
| Cyclone 2: | 0.0066 kg | 0 kg |
| Condenser 1: | 0.0066 kg | 0 kg |
| Condenser 2: | 0.0066 kg | 0.0016 kg |
| Condenser 3: | 0.005 kg | 0.005 kg |
| GLS: | 0 kg | 0 kg |
| Total liquid | | 0.0066 kg |
| Total Char | | 0.0038 kg |

It can be seen from Table 2 above that the product distribution is different from the case with only sand as the bed material. The change in the distribution may be attributed to the effects of olivine in the bed. With the presence of olivine, the weight of wax obtained in this test was 4.301 kg, which is 86% of the feed. This value is higher than the value obtained in the experiment with pure sand. On the other hand, the liquid and char yield reduced when compared to the previous run, both making up only 0.2% of the mass of feed. The oil portion was 0.0066 kg and the total char weighed 0.0038 kg. Further, the weight and volume of the product gas reduced. The weight of the gas including nitrogen was 0.6886 kg (13.8% of feed) and the volume of the gas excluding nitrogen was 1164 L.

Example 3

Pyrolysis of HDPE in Sand Bed

The third experiment was similar to the first experiment, but the feedstock was changed to high-density polyethylene (HDPE), with only sand as the bed material. The sample feed rate and the flow rate of the inert gas were the same as the previous runs, and a total of 5 kg of HDPE was used. The weight of the bed material (sand) in the experiment was 1908 g. Table 3 below shows the quantities of the solid, liquid and the gaseous components obtained after the pyrolysis experiments.

Compared to the test on LLDPE, the total solid obtained after the pyrolysis of the HDPE samples was significantly higher. Although LLDPE and HDPE are both polyolefin polymers, HDPE is more thermally stable than LLDPE. Thus, the higher solid content exhibited by HDPE pyrolysis may be due to its higher thermal stability. The wax component obtained in this run was 2.278 kg, which is 45.6% of the feed. However, the pyrolysis of the HDPE samples exhibited lower oil, char and gas yields. The liquid portion (bio-oil) from the HDPE was 0.452 kg and the char was 0.0027 kg, equivalent to 9% and 0.1% of the feed, respectively. The weight of the product gas obtained from the HDPE samples by mass balance was 2.2673 kg, equivalent to 45.3% of the mass of the feed. As for the product gas volume, a total volume of 1118 L (excluding nitrogen) was measured after the process. Considering the reasons discussed above, it is not surprising that the gas produced from the pyrolysis of HDPE was lower than that of LLDPE.

TABLE 3

Results for HDPE with 100% sand

| Product | Quantity In | Quantity Collected |
|---|---|---|
| Total gas (including nitrogen) | | 2588 L |
| Solid: wax | | |
| Cyclone 1: | 2.278 kg | 0.545 kg |
| Cyclone 2: | 1.7333 kg | 0.683 kg |
| Condenser 1: | 1.05 kg | 1.05 kg |
| Condenser 2: | 0 kg | 0 kg |
| Condenser 3: | 0 kg | 0 kg |
| GLS: | 0 kg | 0 kg |
| Total solid | | 2.278 kg |
| Liquid: oil | | |
| Cyclone 1: | 0.452 kg | 0 kg |
| Cyclone 2: | 0.452 kg | 0 kg |
| Condenser 1: | 0.452 kg | 0.449 kg |
| Condenser 2: | 0.003 kg | 0.003 kg |
| Condenser 3: | 0 kg | 0 kg |
| GLS: | 0 kg | 0 kg |
| Total liquid | | 0.452 kg |
| Total Char | | 0.0027 kg |

Example 4

Pyrolysis of HDPE in Sand/Olivine Bed

The next experiment was performed for the pyrolysis of HDPE, similar to the third experiment, but with both sand and olivine as the bed materials. The sample feed rate and nitrogen flow rate were the same as those of the previous tests, and the duration of this experiment was 158 min. Table 4 below presents the results of the amounts of the pyrolysis products.

TABLE 4

Results for LLDPE with 90 vol% sand + 10 vol% olivine

| Product | Quantity In | Quantity Collected |
|---|---|---|
| Total gas (including nitrogen) | | 2724 L |
| Solid: wax | | |
| Cyclone 1: | 3.2975 kg | 0.0715 kg |
| Cyclone 2: | 3.226 kg | 0.165 kg |
| Condenser 1: | 3.061 kg | 3.061 kg |
| Condenser 2: | 0 kg | 0 kg |
| Condenser 3: | 0 kg | 0 kg |
| GLS: | 0 kg | 0 kg |
| Total solid | | 3.2975 kg |
| Liquid: oil | | |
| Cyclone 1: | 0 kg | 0 kg |
| Cyclone 2: | 0 kg | 0 kg |
| Condenser 1: | 0 kg | 0 kg |
| Condenser 2: | 0 kg | 0 kg |
| Condenser 3: | 0 kg | 0 kg |
| GLS: | 0 kg | 0 kg |
| Total liquid | | 0 kg |
| Total Char | | 0.0057 kg |

As can be seen in Table 4 above, there was no liquid product in this experimental run, which is clearly lower than the conversion with only sand as the bed material. The wax component, on the other hand, was higher than the previous run. 3.2975 kg of wax (66% of the feed) was obtained in this experiment, while the char component was 0.0057 kg (only 0.1% of the feed). Applying mass balance, the product gas amounts to 1.6968 kg, which is 33.9% of the feed supplied. On a volume basis, the product gas (excluding nitrogen) was 1144 L.

Example 5

Pyrolysis of Waste Paper in Sand Bed

The fifth experiment was performed using waste papers as the feedstock. This experiment was conducted in a batch mode. Similar to the continuous experiments, nitrogen at 5 L/min was used to create an inert atmosphere in the process. A total of 5 kg of paper was loaded into the reactor. Table 5 below shows the quantities of the products obtained after the experiment.

Table 5 indicates that the wax quantity obtained in the run was 0.005 kg, the total liquid was measured as 1.7338 kg, and the char quantity was 0.0063 kg, which are, respectively, 0.1%, 34.7% and 0.1% of the feed input. The weight of the obtained product gas was 3.2549 kg (equivalent to 65.1% of the feed) by mass balance, and the volume of the product gas including nitrogen was 2014 L.

TABLE 5

Results for waste paper pyrolysis

| Product | Quantity In | Quantity Collected |
|---|---|---|
| Total gas (including nitrogen) | | 2014 L |
| Solid: wax | | |
| Cyclone 1: | 0 kg | 0.005 kg |
| Cyclone 2: | 0 kg | 0 kg |
| Condenser 1: | 0 kg | 0 kg |
| Condenser 2: | 0 kg | 0 kg |
| Condenser 3: | 0 kg | 0 kg |
| GLS: | 0 kg | 0 kg |
| Total solid | | 0.005 kg |
| Liquid: oil | | |
| Cyclone 1: | 1.706 kg | 0 kg |
| Cyclone 2: | 1.706 kg | 0 kg |
| Condenser 1: | 1.706 kg | 1.706 kg |
| Condenser 2: | 0 kg | 0 kg |
| Condenser 3: | 0 kg | 0 kg |
| GLS: | 0 kg | 0.0278 kg |
| Total liquid | | 1.7338 kg |
| Total Char | | 0.0063 kg |

It is to be understood that the system for processing waste is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A system for processing waste, comprising:
    a fixed bed reactor adapted for receiving a first waste material and producing a first set of reaction products;
    a fluidized bed reactor adapted for receiving a second waste material and producing a second set of reaction products;
    at least one external source of reaction gas selectively in fluid communication with at least one of the fixed bed reactor and the fluidized bed reactor to selectively facilitate a reaction in the corresponding reactor;
    a conduit system connected to the fixed bed reactor, the fluidized bed reactor, and the at least one external source of reaction gas, the conduit system including a plurality of valves to selectively permit separate or simultaneous operation of the fixed bed reactor and the fluidized bed reactor and to selectively mix the first and second sets of reaction products to produce a mixed set of reaction products;
    at least one cyclone separator and an attached solids collection vessel for selectively receiving the first set of reaction products, the second set of reaction products, and the mixed set of reaction products and separating and collecting solids therefrom to produce a mixed set of fluids;
    at least one condenser and an attached liquids collection vessel for receiving the mixed set of fluids and producing a liquid stream and a gas stream, the liquid from the liquid stream being collected in the liquids collection vessel; and
    a gas-liquid separator and an attached gas collection vessel for removing remaining liquid from the gas stream, gas from the gas stream being collected in the gas collection vessel.

2. The system for processing waste as recited in claim 1, wherein the at least one cyclone separator comprises a pair of cyclone separators connected in series.

3. The system for processing waste as recited in claim 1, wherein the at least one condenser comprises a plurality of condensers connected in series with each other.

4. The system for processing waste as recited in claim 1, further comprising a scrubber in fluid communication with the gas-liquid separator for removing unwanted gas components from the gas.

5. The system for processing waste as recited in claim 4, further comprising a pressure vessel in fluid communication with the scrubber for receiving the gas.

6. The system for processing waste as recited in claim 5, further comprising an alkali vessel in fluid communication with the pressure vessel for removing gaseous sulfides from the gas.

7. The system for processing waste as recited in claim 1, wherein the at least one external source of reaction gas comprises a plurality of external sources of reaction gases.

8. The system for processing waste as recited in claim 7, wherein the plurality of external sources of reaction gases comprises an external source of gaseous nitrogen for pyrolysis reactions, an external source of gaseous hydrogen/steam for hydrogenation reactions and an external source of gaseous oxygen/air for combustion reactions.

9. The system for processing waste as recited in claim 8, wherein at least the external source of gaseous nitrogen is in fluid communication with the fluidized bed reactor.

10. The system for processing waste as recited in claim 1, further comprising a liquid feed connected to said fluidized bed reactor.

11. The system for processing waste as recited in claim 1, further comprising at least one first scale for weighing the solids collected from the at least one cyclone separator.

12. The system for processing waste as recited in claim 1, further comprising at least one second scale for weighing the liquid collected from the at least one condenser.

13. A system for processing waste, comprising:
    a fixed bed reactor adapted for receiving a first waste material and producing a first set of reaction products;
    a fluidized bed reactor adapted for receiving a second waste material and producing a second set of reaction products;
    a plurality of external sources of reaction gas selectively in fluid communication with at least one of the fixed bed reactor and the fluidized bed reactor to selectively facilitate a reaction in the corresponding reactor;
    a conduit system connected to the fixed bed reactor, the fluidized bed reactor, and the at least one external source of reaction gas, the conduit system including a plurality of valves to selectively permit separate or simultaneous operation of the fixed bed reactor and the fluidized bed reactor and to selectively mix the first and second sets of reaction products to produce a mixed set of reaction products;

a pair of one cyclones connected in series, the cyclones being connected to the fixed bed and fluidized bed reactors for receiving a stream of reaction products and removing waxes from the product stream, each of the cyclones having a solids collection vessel attached thereto for collecting the waxes;

a plurality of condensers connected in series to the cyclones for separating condensable liquids from the product stream, each of the condensers having a liquid collection vessel attached thereto for collecting the condensed liquids;

a gas-liquid separator for removing any remaining liquid from the product stream, the gas-liquid separator outputting a stream of gas; and a supervisory control and data acquisition system (SCADA) connected to the system.

14. The system for processing waste as recited in claim 13, wherein each said condenser comprises a heat exchanger configured for operation as a condenser.

15. The system for processing waste as recited in claim 13, further comprising a scrubber in fluid communication with the gas-liquid separator for removing unwanted gas components from the gas.

16. The system for processing waste as recited in claim 15, further comprising a pressure vessel in fluid communication with the scrubber for receiving the gas.

17. The system for processing waste as recited in claim 16, further comprising an alkali vessel in fluid communication with the pressure vessel for removing gaseous sulfides from the gas.

18. The system for processing waste as recited in claim 13, wherein the plurality of external sources of reaction gases comprises an external source of gaseous nitrogen for pyrolysis reactions, an external source of gaseous hydrogen/steam for hydrogenation reactions and an external source of gaseous oxygen/air for combustion reactions.

19. The system for processing waste as recited in claim 13, further comprising a liquid feed connected to said fluidized bed reactor.

20. The system for processing waste as recited in claim 13, further comprising a split furnace for applying different levels of heat to said fixed bed reactor and said fluidized bed reactor.

* * * * *